Dec. 25, 1962  D. L. BARTLETT  3,070,399
EXPANDABLE HOUSE TRAILER
Filed Feb. 3, 1961  3 Sheets-Sheet 1

INVENTOR.
DAVID L. BARTLETT
BY
*H. W. Brelsford*
ATTORNEY

Dec. 25, 1962  D. L. BARTLETT  3,070,399
EXPANDABLE HOUSE TRAILER
Filed Feb. 3, 1961  3 Sheets-Sheet 2

INVENTOR.
DAVID L. BARTLETT
BY
*H. W. Brelsford*
ATTORNEY

Dec. 25, 1962 D. L. BARTLETT 3,070,399
EXPANDABLE HOUSE TRAILER
Filed Feb. 3, 1961 3 Sheets-Sheet 3
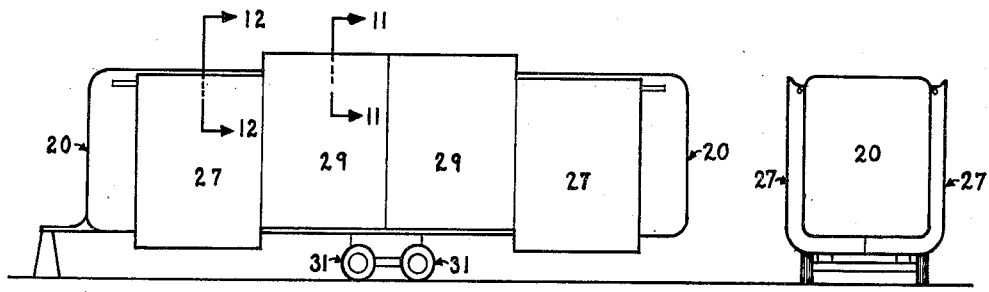
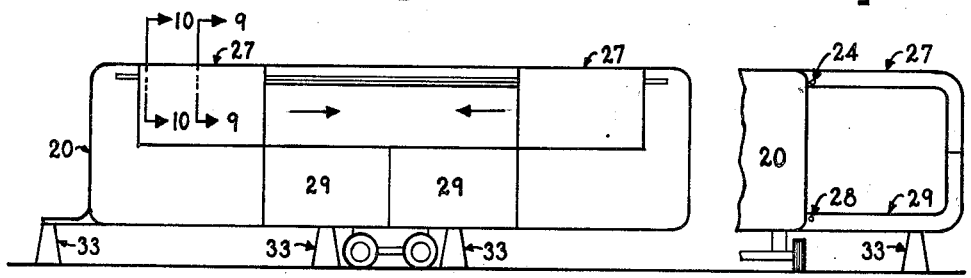
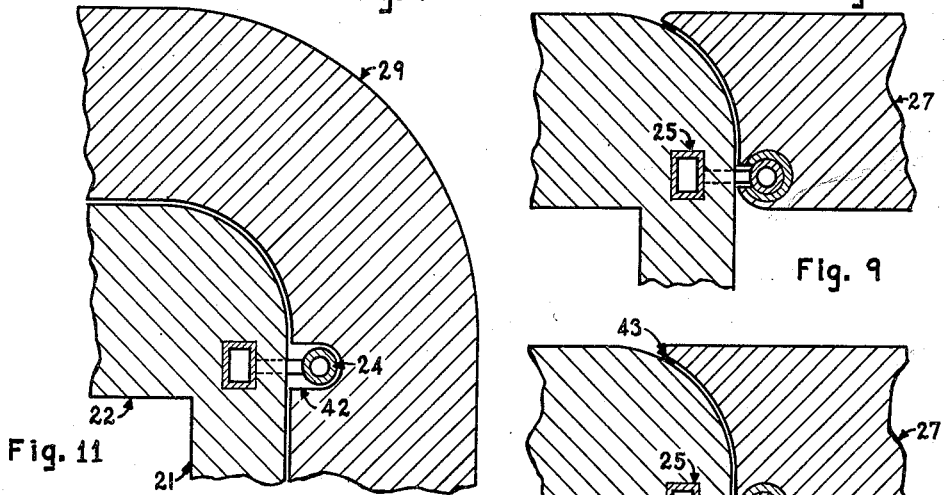
INVENTOR.
DAVID L. BARTLETT
BY H. W. Brelsford
ATTORNEY

United States Patent Office 3,070,399
Patented Dec. 25, 1962

3,070,399
EXPANDABLE HOUSE TRAILER
David L. Bartlett, Santa Barbara, Calif.
(1357 Camden Lane, Ventura, Calif.)
Filed Feb. 3, 1961, Ser. No. 86,902
4 Claims. (Cl. 296—26)

This invention relates to expandable dwellings and has particular reference to an expandable mobile home.

Various types of expandable mobile or trailer homes have been manufactured in an attempt to construct a dwelling of adequate size but which can nevertheless be collapsed or condensed for travel over the highways. Most states restrict load widths to dimensions from 8 to 10 feet. Accordingly, to avoid narrow rooms in mobil houses, some expansion principle is required. Telescoping sections are now prevalent in the commercial market. Other designs used pivoted sections on generally vertical hinge axes. Other designs employ decks that are attached to the trailer and canopies are then constructed over them. The present invention is believed to be an improvement over these various prior constructions.

The present invention is based upon the discovery of a combination of hinged and sliding room elements. These elements fold flat against the exterior of the mobile home while it is traveling over the highway. Upon being located at a dwelling site, these room elements are pivoted away from the trailer body and then slide into registry to form roof and floor portions of rooms for the trailer body. Sidewalls of any suitable material are next positioned and the room is complete. The invention makes possible the doubling of living space over that available for a trailer body in the form that it is transported on the highways.

It is therefore a general object of the invention to provide an improved expansible trailer home.

Another object is to provide an expansible trailer home wherein the expansible room elements are permanently secured to the trailer body.

Another object is to provide a combination of hinged and sliding room elements that are permanently, though movably, attached to the trailer body.

A further object is to provide a mobile home with a combined rail and hinge structure for expansible room elements.

Still another object is to provide lightweight expansible room elements wherein structural strength is obtained from thickness of section.

Other objects, features and advantages of the invention will be apparent in the following description and claims considered together with the accompanying drawings forming an integral part of this specification in which:

FIG. 5 is a side view of the trailer of FIG. 1.

FIG. 6 is a rear view of the trailer of FIG. 1.

FIG. 7 is a sideview of the trailer as shown in FIG. 2 with the room elements rotated outwardly.

FIG. 8 is a fragmentary rear view of one-half of the trailer of FIG. 2 with the room elements rotated outwardly.

FIG. 9 is a sectional view along the line 9—9 of FIG. 7 showing the hinge and rail structure.

FIG. 10 is a sectional view along the line 10—10 of FIG. 7 showing the slot in the movable room elements for receiving one of the posts supporting the hinge rail.

FIG. 11 is a sectional view along the line 11—11 of FIG. 5 and showing the slot in the lower room elements to accommodate the hinge rail for the upper room elements.

FIG. 12 is a sectional view along the line of 12—12 of FIG. 5 and showing the hinge position of an upper room element.

Figure 1:
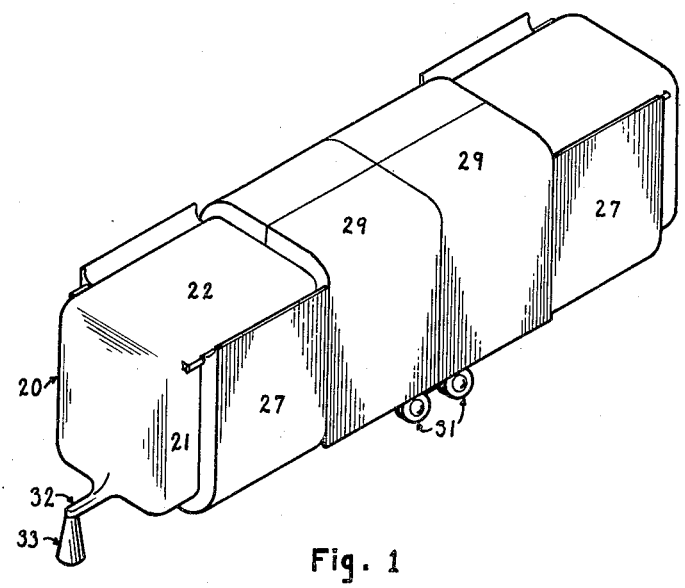
FIG. 1 is a three dimensional view of a mobile home incorporating the invention wherein the rooms are collapsed and it is ready for travel over the highway.
Figure 2:
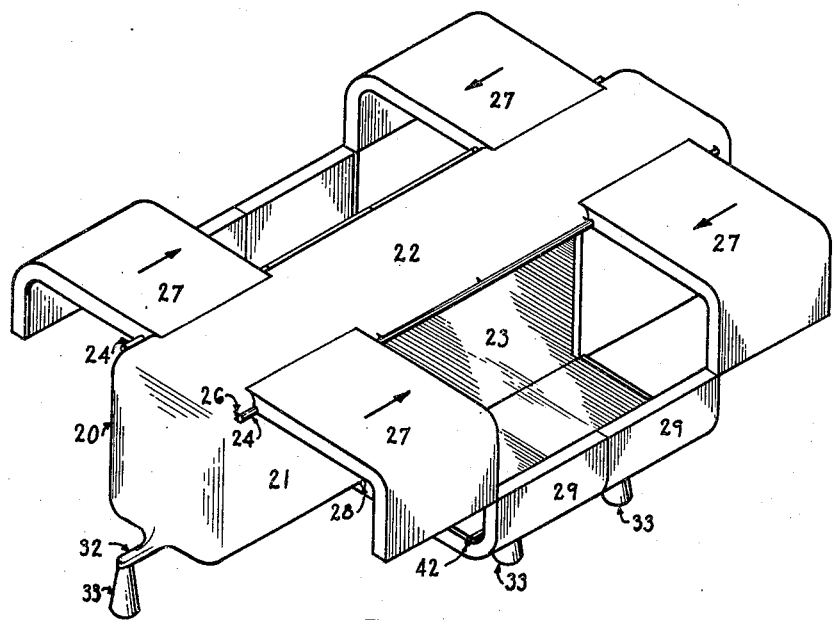
FIG. 2 is a three dimensional view of the trailer of FIG. 1 with the expansible room elements hinged outwardly.
Figure 3:
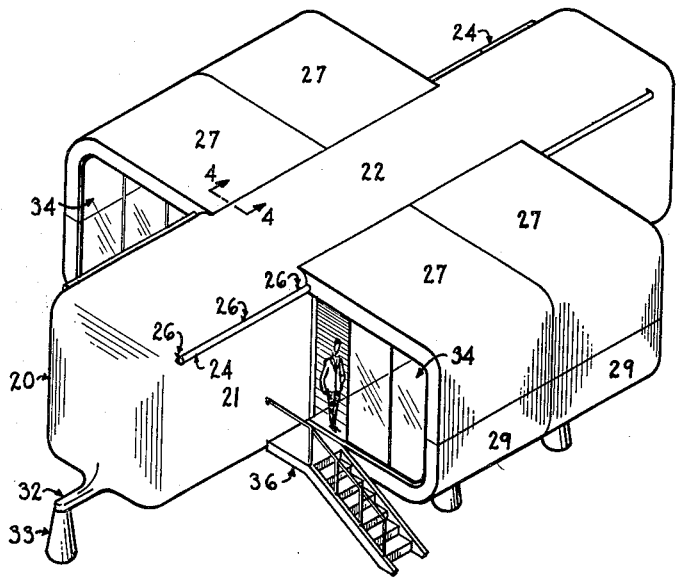
FIG. 3 is a three dimensional view of the trailer of FIG. 1 wherein the upper hinged room elements have been slid over the lower room elements to complete roof and floor structures.

Referring to FIGS. 1, 2 and 3, there is illustrated a trailer embodying the invention which is in the form of an elongated body member 20 having generally vertical sidewalls 21 and a generally horizontal top 22. A bottom 23 for the trailer body 20 is also horizontal. This general rectangular cross-section of the trailer body 20 gives rise to maximum utilization of the interior space and for the sake of appearances, the juncture between vertical sidewall 21 and the top of the room 22 is rounded. Positioned at the region of each juncture between the vertical sidewalls and the roof, is a rail 24. These rails are spaced outwardly from the body 20 by means of posts 26. Pivoted on these rails 24, and slideable on these rails 24, are upper room elements 27. A similar rail 28 is part of a hinge structure whereby lower room elements 29 may be pivoted to the trailer body 20.

These upper room elements 27 and lower room elements 29 are provided particularly in accordance with the invention. It will be noted that each room element has an L-shaped cross-section. Further, these L shapes are so proportioned with respect to the trailer body 20 that they fit snugly against the sides. The shorter leg of the L shape projects underneath the trailer for the upper room sections 27, and projects above the trailer body 20 for the lower room sections 29. When the trailer is transported over the highways, the room elements are all nested against the body 20 as shown in FIG. 1. The trailer 20 is supported during travel on the highway by suitable wheels 31 and is attached to a truck-tractor by means of a usual trailer hitch member 32. When the trailer is placed at a dwelling side support members 33 may be placed under the trailer hitch 32, placed adjacent to the wheels 31, placed adjacent to the rear end of the trailer, and placed under each lower room element 29. In this fashion, the entire device is made rigid with respect to the ground, and bears on the ground.

Carried within the trailer 20 may be suitable side panels 34 for the two rooms constructed from the upper shells 27 and the lower room shells 29. Any suitable construction may be employed and sliding glass doors are presently preferred. Similarly, readily attachable steps 36 as shown in FIG. 3 may be carried in the trailer during transportation over the highways.

Two-dimensional views are illustrated in FIGS. 5 through 8. There, it will be noted that the lower room shells 29 project above the level of the roof 22 of the trailer body 20 when they are nested against the trailer body. In a similar fashion, the upper room elements 27 project below the body 20, but nevertheless have adequate clearance from the highway because of the placement of the wheels 31. These shells 27 form a U shape exterior covering around the bottom of the trailer body 20 as shown in FIG. 6. As illustrated most clearly in FIG. 1, the lower room elements 29 form an inverted U shape covering over the top 22 of the trailer body 20.

Figure 4:
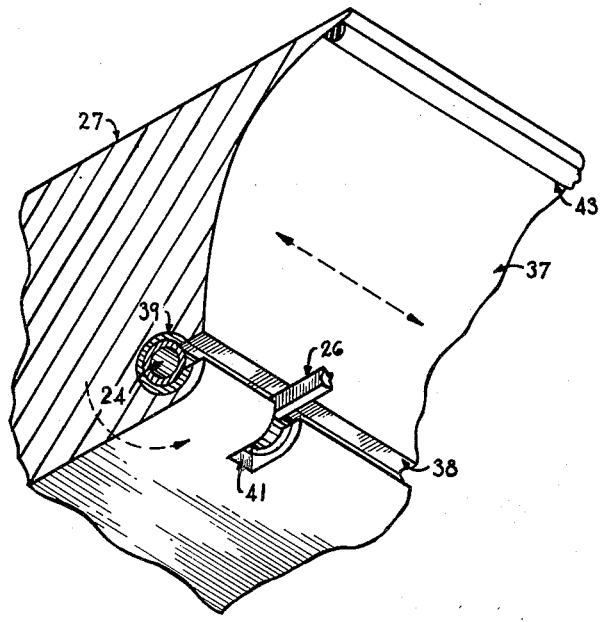
FIG. 4 is an enlarged isometric view of the combined hinge and rail mechanism taken along the line 4—4 of FIG. 3.

Illustrated most clearly in FIG. 4 and FIGS. 9 through 12 is the combined hinge and rail structure along the top of both sides of the trailer 20. Referring first to FIG. 4, there is illustrated one of the posts 26 that support the cylindrical rail 24 and this post 26 is shown broken off near the region of its attachment to the trailer body 20. The upper end of each L-shaped member 27 has a concave edge 37 in order to match the curvature of the juncture between the top 22 and the sidewalls 21. Formed in this concave edge 37 is a slot 38 of sufficient width to permit sliding of the members 27 over the stationary posts 26 connected to the trailer body 20. The bottom of the slot 38 is enlarged and is cylindrical in shape and preferably defined by a slotted metal or plastic tube 39. Sufficient clearance is provided between the rail 24 and the tube 39 to permit sliding between the two as well as rotation.

Referring to FIG. 4, it will be realized that rotation of the upper room elements 27 to a nesting position against the trailer 20 will cause physical interference between the room elements 27 and the projecting posts 26. Accordingly, transverse slots 41 are formed in the shells 27 at the region of the lengthwise slot 38 so that there may be free rotation to the nesting position. These slots 41 are so spaced with respect to the stationary posts 26 that the upper room shells 27 are locked against lengthwise movement when in a nesting position. The transverse slots 41 act not only to permit this rotation to a nesting position, but serve the additional function of a mechanical lock.

Referring further to FIGS. 9 through 12, it will be noted that this slot 41 is illustrated also in FIG. 10. The posts 26 are shown as attached to a rectangular tube 25 which is indicative of any secure mechanical support.

Referring to FIG. 11, it will be noted that when the lower room shell 29 is rotated over the top 22, suitable clearance must be made for the rail 24. This is accomplished by forming a slot 42 in these lower room elements 29.

Referring to FIGS. 4 and 12, suitable seals must be employed to make the joint watertight between the upper room shells 27 and the top 22. An elastic compressible seal 43 is preferred for this purpose and may be secured to the room elements 27 as illustrated, or may be permanently affixed to the trailer 20. Similar compression seals may be used on the adjoining edges of the upper shells 27 to render that joint watertight and they may be used in the juncture between the upper shells 27 and the lower shells 29.

The shells or room elements 27 and 29 may be constructed of any suitable material, however there is presently preferred a thick-wall construction wherein a light weight insulating material is adhered to skins forming the exterior and interior respectively. For this reason, these walls are thick compared to the dimensions of the L shape and may, for example, be six to twelve inches thick. These skins may be formed of any suitable materials such as sheet aluminum, formed plywood, or plastic sheet reinforced with Fiberglas. Any of the stiff, inelastic foam materials are presently preferred such as organic plastic foam of which expanded polystyrene and polyurethane are examples. These foam materials are preferably rigidly adhered to the skin materials and accordingly the foam acts as the web of a beam to give great mechanical strength and rigidity. Additionally, the foam also acts as an excellent thermal insulator.

The hinge structure 28 for the lower room element 29 may be similar to that of the rail construction 24 or may have any other suitable construction. A large sidewall opening in the center of the trailer body 20 is presently preferred so as to make one large room out of the added floor space of the shells and of the center of the trailer. However, it will be recognized that any desired room combination may be formed by having one or more sidewalls intact as this region. Suitable latches (not shown) may be used to lock the upper and lower shells together in position as shown in FIG. 3 and likewise suitable latches (not shown) may be used to hold the shells in their nesting position as shown in FIG. 1.

It will be apparent to those skilled in the art that the lower section may slide into vertical alignment with the upper section as well as vice versa. Also, it will be apparent that the relative traveling position of the upper and lower shells may be reversed. Accordingly, the invention is not limited to the precise structure disclosed, but the invention includes all modifications and variations that come within the true spirit and scope of the invention. The invention accordingly is not limited to the structures illustrated.

What is claimed is:

1. An expandable trailer house comprising: an elongated body having generally vertical sides; a plurality of room elements having L shapes elongated lengthwise; means pivoting at least one of such room elements at the top of the L shape to the top of at least one side of the trailer body; means pivoting at least one of the other such room elements at the end of the long extremity of the L shape to the bottom of the same side of the trailer body to invert said L shape element; and means for sliding one of said pivoted room elements into vertical alignment with the other when both are pivoted outwardly of the trailer body, said room elements being so oriented with respect to the trailer that they conform to the outline of the trailer when rotated against the trailer body and form upper and lower room shells when roated outwardly from the trailer body.

2. An expandable trailer as set forth in claim 1 wherein there are plural L shapes on each side of the trailer.

3. An expandable trailer as set forth in claim 1 wherein there are plural L shapes on each side of the trailer, and the first mentioned pivoted L shapes are so proportioned as to enclose a portion of the trailer with a U shape, and the second mentioned pivoted L shapes are so proportioned as to enclose another proportion of the trailer with in inverted U shape, when these various shapes are nested against the trailer body.

4. An expandable trailer as set forth in claim 1 wherein the open sides of the expanded upper and lower pivoted L shapes are closed by wall panels.

References Cited in the file of this patent

UNITED STATES PATENTS 1,251,483    Days ------------------ Jan. 1, 1918